J. & A. LAPKE.
HAY PRESS.
APPLICATION FILED APR. 25, 1912.
1,050,032.
Patented Jan. 7, 1913.
4 SHEETS—SHEET 1.
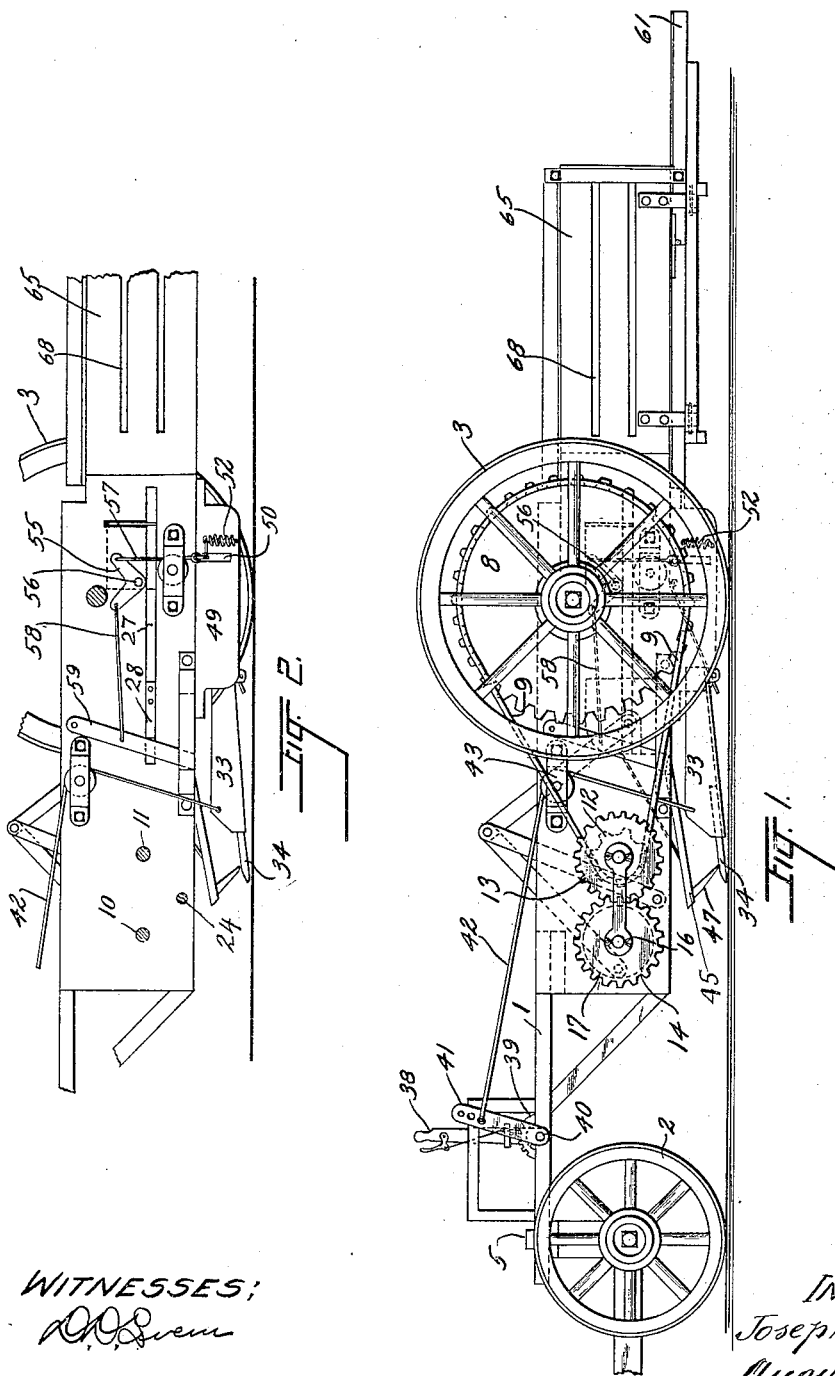
WITNESSES:
INVENTORS
Joseph Lapke
August Lapke
BY
ATTORNEY

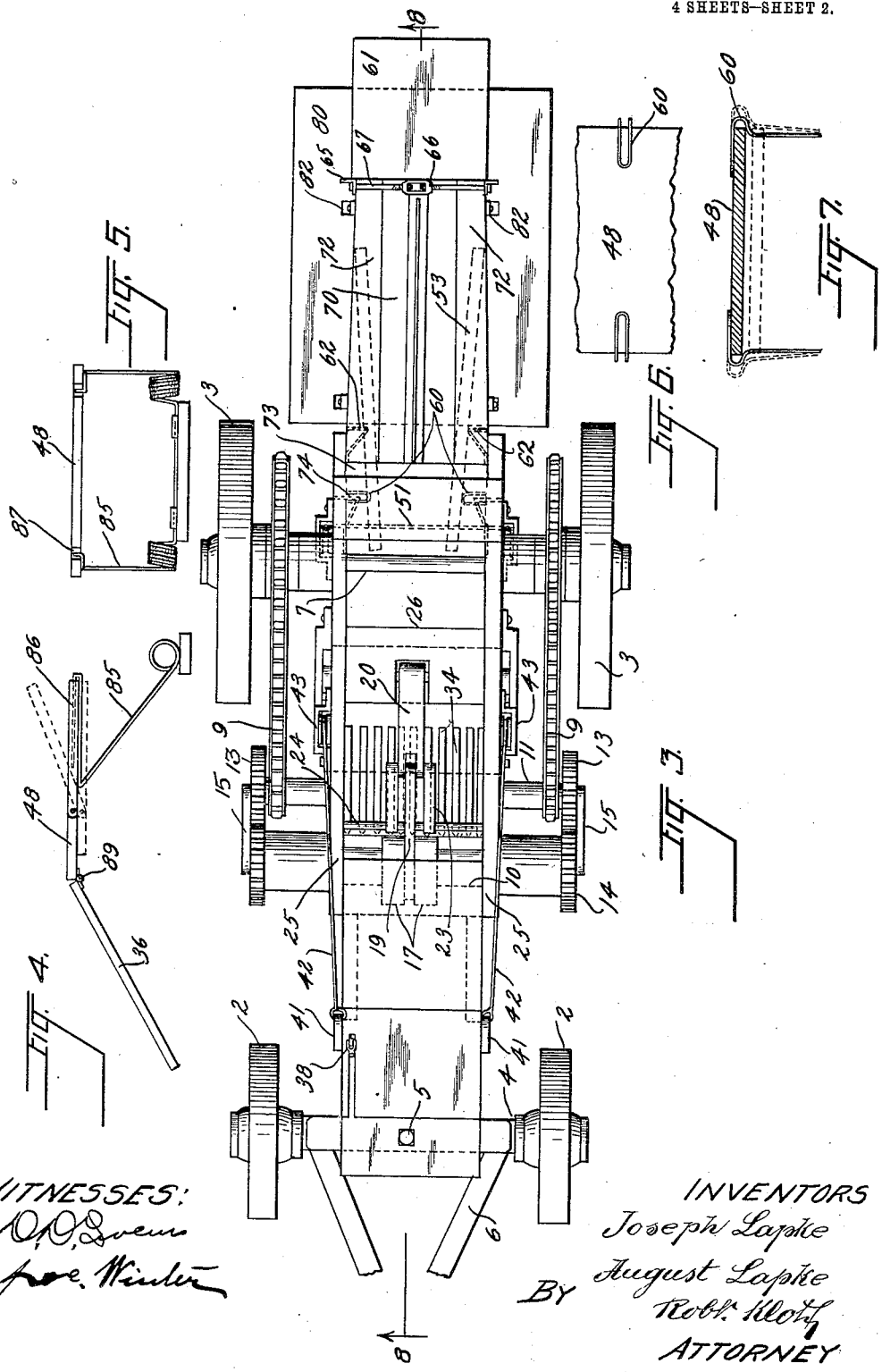

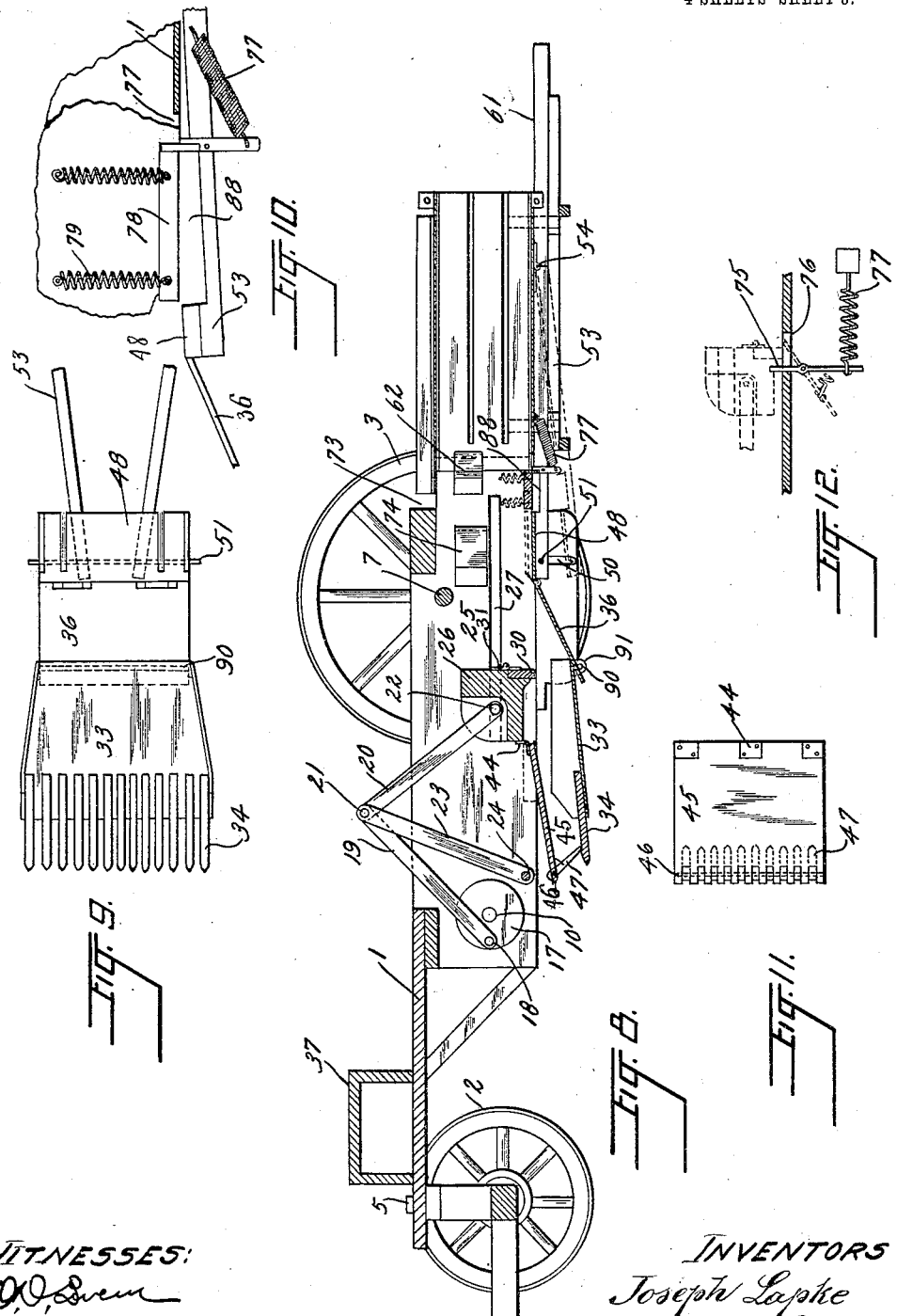

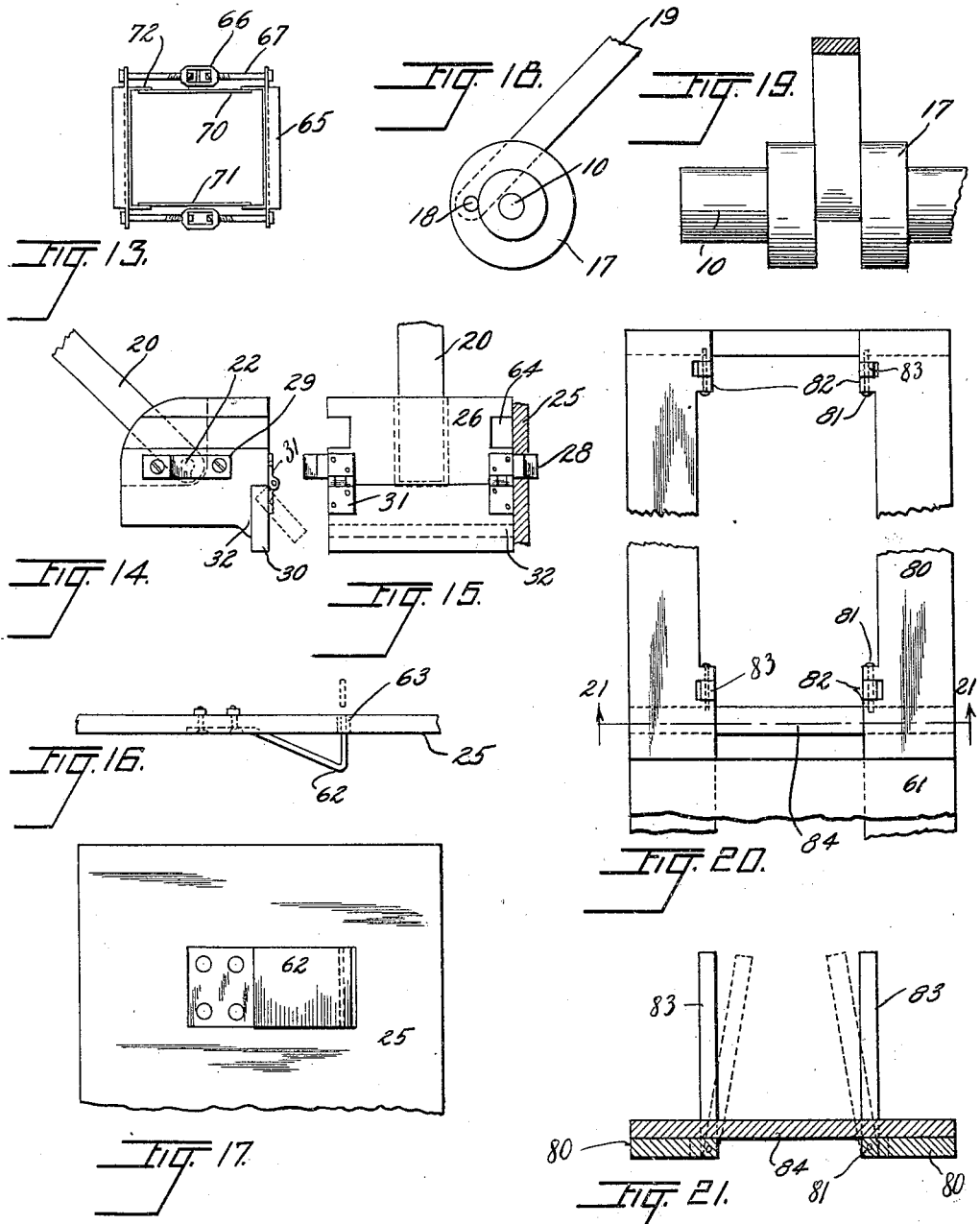

UNITED STATES PATENT OFFICE.

JOSEPH LAPKE AND AUGUST LAPKE, OF CHICAGO, ILLINOIS.

HAY-PRESS.

1,050,032.  Specification of Letters Patent.  Patented Jan. 7, 1913.

Application filed April 25, 1912. Serial No. 693,032.

*To all whom it may concern:*

Be it known that we, JOSEPH LAPKE, a citizen of the United States, and AUGUST LAPKE, a subject of the Emperor of Germany, both residing at Chicago, Illinois, have invented certain new and useful Improvements in Hay-Presses, of which the following is a specification.

The essential object of this invention is to provide a machine which will gather the hay from the ground as it has fallen from the mower, and which will, also, bale the hay. Many baling machines are known in the art, into which machines the loose hay must be fed by hand, thus necessitating the two separate and distinct operations of raking or gathering the hay from the ground and then of baling the loose hay, but the machine herein-described entirely dispenses with manual handling of loose hay, and, when this invention is used, the hay is not handled except by the machine, from the time that it falls upon the ground until it is completely baled and ready for shipment.

In the drawings Figure 1 is a side elevation of the hay-press; Fig. 2 is a detailed view of part of the mechanism for controlling the rake and the other parts by which the hay is conveyed from the ground to the point where it is acted upon by the compressing or baling mechanism; Fig. 3 is a top plan view of the hay-press; Figs. 4, 5, 6, and 7 are details of some of the members by which the hay is moved to the point where it is compressed; Fig. 8 is a section on the line 8—8, Fig. 3; Fig. 9 is a top plan view of the rake and some connected parts; Fig. 10 is a detailed view taken at right-angles to the view shown in Fig. 9, showing the members at the right-hand end of said Fig. 9; Fig. 11 is a detailed view of one of the members used for forwarding the hay; Fig. 12 is a view, partly in section, of the device shown at the right-hand end of Fig. 10, the plunger or compressor being shown in dotted lines; Fig. 13 is a rear-end view of the delivery and compressing chute, showing the means for regulating the size thereof; Figs. 14 and 15 are views of the plunger or compressor; Figs. 16 and 17 are views of some of the parts which prevent a retrograde movement of the hay which has been forwarded beyond a certain point; Figs. 18 and 19 show part of the mechanism by which the plunger is caused to reciprocate; Fig. 20 is a detailed view showing the platform upon which one of the attendants stands; and Fig. 21 is a sectional view on the line 21—21, Fig. 20.

The press, and all parts of the machine, are carried upon a vehicle comprising a framework 1 which is supported by front wheels 2 and rear wheels 3, the operating parts being driven by said rear wheels 3. The axle 4, upon which the wheels 2 are journaled, is secured by a king-pin 5 at the front end of the framework, and the horses or traction engine are attached to the machine by the shaft 6. The rear wheels 3, by which the power is supplied, are mounted upon an axle 7, which is preferably provided with a differential (not shown) such as is commonly used on automobiles or with some other equivalent contrivance in order that the two wheels 3 need not rotate in unison. Upon the axle 7 are the sprocket-wheels 8 which are locked to wheels 3 by any suitable contrivance such as a pawl and ratchet, and the sprocket chains 9 which pass over wheels 8 communicate motion from wheels 3 to the operating parts (Figs. 1 and 3). It should be understood that the sprocket wheels 8 can be unlocked from wheels 3 whenever desired in order that the machinery may remain idle when the press is being merely transported to the place where it is to be used.

Journaled transversely of the machine are shafts 10 and 11. Sprocket pinions 12 are secured to the shaft 11, and at the outer ends of shaft 11 are gears 13 which mesh with and drive the gears 14 on shaft 10. At the ends of shafts 10 and 11 are links 15, secured in place by linch-pins 16 (Fig. 1), the object of said links being to hold the ends of the shafts 10 and 11 at a fixed distance apart and thus keep the gears 13 and 14 in mesh notwithstanding the inevitable vibration and rattling of the machine. The operating parts which compress the hay into bales are driven from the shaft 10, and in order to secure the maximum efficiency said shaft should rotate in a direction opposite to that in which wheels 3 rotate. The means herein shown for transmitting motion from wheels 3 to shaft 10 are well adapted to perform the function but may be replaced by any other equivalent mechanical appliance.

The shaft 10 is divided at about its middle and carries upon each part a member 17 upon which the pin 18 is eccentrically secured (Figs. 3, 8, 18). A toggle-joint is provided composed of the two links 19 and 20 pivoted together at 21, link 19 being also pivoted to pin 18, and link 20 to rod or shaft 22. A link 23 is pivoted to the toggle-joint at 21 and is also pivoted upon the rod 24 which extends from one wall 25 to the other wall, said link 23 serving to support the toggle-joint and to confine its movements within predetermined limits (Fig. 8).

In the space between the two side-walls 25 is the reciprocating plunger or compressor 26 which is caused to move back and forth in a substantially horizontal plane, and at each forward stroke, i. e., each movement toward the right, Figs. 1, 3, or 8, acts upon the hay which has been gathered from the ground and forces the hay toward the open end of the compressing chute. The plunger 26 is of substantially the same size as the transverse section of the bale to be formed and is adapted practically to fill the space between the side-walls 25. The walls 25 are slotted at 27 (Figs. 2, 14, and 15) to receive the straps 28 which are fastened by screws or bolts 29 to the plunger 26 (Figs. 14 and 15), and said straps or lugs 28, in conjunction with the slot 27, support the plunger and control its path of travel. The rod 22 may have its ends received within recesses provided therefor in straps 28, thus affording a convenient means for securing rod 22 to the plunger. The bottom edge of the plunger is not integral with the main body thereof but is formed of a plate 30 hinged to the plunger by hinges 31 (Figs. 8 and 14). When the plunger takes a forward stroke, the plate 30 will be forced against the hay which has accumulated in the path of travel of the plunger and said plate will be forced into the position shown in Fig. 8, and in full lines in Fig. 14; but when the plunger is retracted toward the left the plate 30 may swing to the dotted-line position in Fig. 14 and thus prevent binding or clamping of the plunger. The plunger is provided with a shoulder 32 which reinforces the swinging plate 30. The lower edge of plate 30 is adapted to engage part of the floor upon which the hay rests before being compressed, while the shoulder 32 is adapted to clear said floor.

The rake, which comprises the bed 33 and the tines 34 (Fig. 9), is pivotally mounted, and is connected with chute 36. At a point near the driver's seat 37 is the lever 38 provided with a pawl adapted to lock with the ratchet 39 (Fig. 1). Lever 38 is fixed upon the shaft 40, which carries the crank-arm 41 from which the chain or rope 42 extends over the sheave 43, and which is secured to the bed 33 (Figs. 1 and 2). If the lever 38 be moved toward the left in Fig. 1, the rake is thereby lifted off the ground, but when the parts are in the position shown in said Fig. 1, the tines 34 are adapted to ride upon the ground. As the machine is drawn toward the left in Fig. 1, the tines 34 will ride underneath the hay which has fallen upon the ground, and the hay, both because of the forward movement of the vehicle and of the appliances presently to be described, will pass upon the bed 33 and upwardly along the chute 36.

Hinged to the plunger 26 at 44 is the plate 45 (Figs. 1 and 8). At the end of said plate opposite to the hinges is a rod 46, upon which teeth 47 are loosely mounted. At each forward stroke of the plunger the plate 45 will be carried therewith and the teeth 47 will catch the hay which has collected upon the tines 34 of the rake and will carry the hay off the tines and off the bed 33 into the chute 36. When the plunger moves rearwardly or toward the left, Fig. 8, the teeth 47 will ride loosely over the hay which has collected upon tines 34 during the first forward motion of the plunger, and at the second forward motion will carry into the chute 36 the hay which has collected upon the tines 34 during the first forward motion, and so on, each forward motion of the plunger being adapted to advance for a certain distance that hay which has been collected by the rake during the previous forward stroke of the plunger. The forward movement of the plunger 26 carries it sufficiently far toward the right, Fig. 8, for the teeth 47 to clean the hay off the tines 34 and bed 33 and to carry the hay upwardly through the chute 36 until the hay rests upon the floor of the vertically reciprocating table 48 (Fig. 8).

Table 48 is placed beneath the path of travel of the plunger 26 in such position that, at each forward stroke of the plunger the bottom edge of the swinging plate 30 will scrape the floor of the table and thus clean off any hay which may rest thereupon. Depending from the sides 25 are boards 49, each provided with a slot 50 (see Figs. 2 and 8), and a rod 51 extends from side to side of the machine with its ends projecting through slots 50. Said rod 51 is also secured to the table 48, and springs 52 (see Fig. 1) secured to the boards 49 are connected to said rod 51 and keep the same and the table 48 normally depressed. Arms 53 extend beneath the table and form a bed therefor, said arms being hinged at 54 to the under side of the compressing chute. To each wall 25 a bell-crank 55 is pivoted at 56 (Fig. 2). Links 57 connect the bell-crank 55 to the rod 51, while the link 58 connects the bell-crank to the lever 59. Said lever is pivoted to the side of the machine and is disposed in the path of travel of the strap or stop 28 which is secured to the reciprocating plunger and which projects outwardly through slot 27. Each time that the plunger moves toward the left (Fig. 1 or 2), the stops 28 strike the levers 59, thereby rocking the bell-crank 55 and causing the table 48 to move upwardly. The hay which is upon said table is thereby lifted to a point where it lies in the path of travel of the plunger 26 and will be acted upon at the next forward stroke of the plunger. The size of the parts and their arrangement is such that the table 48 will begin to descend just at the time that the plunger touches the table, but in order to prevent the hay upon the table from falling out of reach of the plunger as the table 48 descends, spring-like catches 60 are provided, which said catches are secured to the sides 25 and project inwardly through the slots 50 (Figs. 6 and 7). As the table 48 sinks or is depressed from the full-line position Fig. 7 to the dotted-line position (or from the dotted-line position to the full-line position in Fig. 8), the inwardly-projecting arms of the catches 60 will remain in place and will not only keep the hay from falling but will positively hold the same up at a point where it will be caught and acted upon by the compressor 26. Each successive forward reciprocation of the compressor 26 carries toward the open end of the compressing chute and toward the delivery platform 61, Fig. 8, the hay which has been picked off the ground and successively advanced until it rests upon the spring-like catches 60, and forces each successive batch of hay toward the platform 61. Upon the inner side of the walls 25 are spring-like tongues 62, one end of each of which projects through a perforation 63 in the wall 25 (Fig. 16), and as the hay is forced toward the right by the plunger these tongues 62, projecting inwardly into the machine, will catch the hay which has been carried past said springs and prevent any retrograde movement of the hay. The plunger-head is slotted at 64 (Fig. 15) so as to enable same to clear the tongues 62, and while the plunger moves toward the right in Fig. 8 a considerable distance beyond the tongues 62, the plunger can readily return to the left of said tongues and therebeyond, whereas the hay which has been carried to the right of said tongues cannot move to the left thereof.

Beyond or to the right of the tongues 62 is the compressing chute which comprises four walls gradually tapering together and forming a prism-like structure. The sides 65 (Figs. 1 and 13) of the compressing chute are really prolongations of and may be formed integrally with the walls 25, and the sides can be drawn together or retracted from each other by tightening or loosening the turnbuckles 66 which ride upon the screw-threaded ends of the rods 67 which are secured in any appropriate manner to the sides 65. The sides 65 are slotted at 68, the purpose of said slots being to permit the insertion of the wires which are used for binding the baled hay together. The top 70 and bottom 71 of the delivery chute are preferably made of sheet metal, the edges of said top and bottom being adapted to bear against angle-irons or brackets 72 which are fixed upon the walls 65.

The top 70 is slotted at 73 and a board or partition is adapted to be dropped through said slot 73 and rest upon the bottom of the compressing chute. The board is not shown in the drawings but is to be dropped in place whenever enough hay has been accumulated within the compressing chamber to form a bale, and the function of the board is to keep the hay comprising successive bales separated. In order to prevent the hay from pushing the board toward the left, Fig. 8, and get same in way of the movable parts, catches 74 are provided which are constructed in a manner practically identical with tongues 62, and which are disposed in horizontal alinement therewith in order that the slots 64 in the plunger will clear said catches 74 (Fig. 8).

In order to assist the tongues 62 in preventing a retrograde movement of the hay which has been carried into the delivery and compressing chute by the plunger, the pivoted stop 75 is provided, which stop projects upwardly through a slot 76 in the bottom (see Fig. 12). Said member 75 normally projects upwardly to where its upper edge is in the path of travel of the plunger, and, at each forward stroke, the plunger will ride over said member 75 and depress the same as shown in Fig. 12, the position of the parts being indicated by the dotted lines. After the plunger has moved beyond the slot 76 the spring 77 will carry the member 75 back to the full-line position and when the plunger moves toward the left the board 30, which is loosely pivoted upon the plunger, will ride over member 75 (rising to the dotted-line position, Fig. 14), but immediately thereafter drop into the full-line position in said Fig. 14.

On the left-hand side (Fig. 8) of the stop 75 is a table or board 78 which extends from one wall 65 to the other (see Figs. 8 and 10). Said table is normally kept elevated by the springs 79. The upper surface of member 78 is approximately upon a level with the surface of the table 48 when it is in its topmost position. As the plunger 26 takes a forward stroke, the lower edge of the board 30 will scrape said table or member 78 and may depress the same somewhat against the resistance of the springs 79.

A platform 80 is provided in order that the man or men who are in charge of the machine may ride thereupon and stand in convenient position for manipulating the wires which are used for baling the hay.

Said platform comprises footboards which are pivoted by pins 81 to ears or lugs 82. The delivery chute carries brackets 83 upon which the cross pieces 84 are adapted to be supported. The footboards rest upon said supports 84 and the delivery platform 61, upon which the bales fall as they emerge from the compressor, is permitted to rest upon the rear end of the platform 80.

As shown in Figs. 4, 5, and 9, springs 85 are provided, the ends 86 of which are received within recesses 87 in table 48. The object of the springs is to keep the table 48 and the chute 36 normally pressed toward the right in Fig. 4. The arms 53 which support the table 48 are recessed at 88 (Figs. 8 and 10) in order to accommodate the member 78. The chute 36 is hinged or pivoted at 89 to the table 48 (Fig. 4) and at its lower end rides over the rod 90 (Fig. 8) and beneath the edge of the bed 33. In this way the rising and falling of the table 48 and the chute 36 will not disturb the rake composed of the bed 33 and tines 34. Said bed 33 is provided with ears 91 which encircle rod 90, and thus the rake can rise or fall, rocking upon rod 90 in accordance with the movements of the lever 38. The rod 90 may be supported upon boards 49 or in any other convenient manner.

The operation is as follows: As the machine is drawn by the horses toward the left, Fig. 1, some hay is scraped off the ground by the rake and gradually passes over the bed 33, chute 36, and upon the table 48 when the same is in the dotted-line position, Fig. 8. This movement of the hay from the ground to the table 48 is expedited and, in a way, secured by the teeth 47 which reciprocate in accordance with the movements of the reciprocating plunger. At each movement of the plunger and just before the beginning of its forward stroke, the reciprocating table 48 is lifted by the devices shown in Fig. 2 to the full-line position in Fig. 7. The catches 60 will hold the hay in elevated position where it will be engaged and caught by the plunger during its forward stroke, and the plunger will force the hay off the table 48 and into the compressing and delivery chute. For the first few strokes of the plunger, when the machine has first begun to operate, the hay will be rather loose in the compressing chute, but after the machine has been in operation a short time the delivery chute will become tightly packed with hay, because a new and additional amount of hay is carried or forced into the chute at each reciprocation of the plunger. The hay is compressed because the body of the hay is forced to travel through the compressing chute which tapers toward the open end. When enough hay has accumulated in the compressing chute to form the first bale, a board is dropped through the slot 73 thus separating the first bale from the second bale, and as the machine continues operations the second bale gradually ejects the first bale from the chute, it being understood that the first bale is wired while it is still within the chute. The hay which has once been forced into the chute is retained therein by the tongues 62 and the spring-controlled member 75. All moving parts are supplied with power from the wheels 3 and the rotation of said wheels is communicated to the plunger by means of the sprockets and gears and other mechanism, which show to best advantage in Figs. 1, 3, and 8 of the drawing. Each reciprocation of the plunger is accompanied by a reciprocation of the vertical table 48.

It will be obvious from all that has been stated heretofore that this machine is adapted to gather the hay from the ground, advance it to a point where the hay can be compressed, and to compress and bale the hay, and that all of said several operations are performed by the one machine, and manual labor of handling loose hay is rendered entirely unnecessary. The only manual labor involved is to drop the boards through the slot 73 and to affix the wires to the bales, but with these exceptions every step from the gathering of hay from the ground to the delivery of the bound and completed bales upon the platform 61, is performed by machine.

It will be obvious that many details of construction may be changed and many well-known mechanical equivalents may be substituted for the specific parts shown in the drawings and set forth in the specification, but that such changes will not involve a departure from the scope of the invention or of the various claims.

We claim as our invention:

1. In a hay-press, the combination of a reciprocating compressor adapted to travel in a substantially horizontal plane, a rake carried beneath said compressor and adapted to gather the hay from the ground, and means operated by the plunger for removing the hay from the rake and advancing same to a point in the path of travel of the plunger.

2. In a hay-press, the combination of a framework, wheels upon which the same is supported, a reciprocating compressor, a shaft adapted to rotate in a direction opposite to said wheels, means whereby said wheels drive said shaft, and means intermediate said shaft and said compressor to translate rotation of said shaft into motion of said compressor.

3. In a hay-press, the combination of a reciprocating compressor, a rake adapted to gather the hay from the ground, means for advancing said hay off said rake, a reciprocating table upon which said hay is adapted to pass, and means for moving said table to a point where the hay carried thereupon will be in the path of travel of said compressor.

4. In a hay-press, the combination of a reciprocating compressor, a table which reciprocates approximately at right angles to the path of travel of said compressor, means for gathering the hay from the ground and placing same upon said table, and means for moving said table to a point where the hay carried thereupon will be in the path of travel of said compressor.

5. In a hay-press, the combination of a framework, wheels upon which the same is supported, a compressor adapted to reciprocate in horizontal plane, a shaft adapted to rotate in a direction opposite to said wheels, means whereby said wheels drive said shaft, and means for converting rotation of said shaft into longitudinal reciprocation of said compressor.

6. In a hay-press, the combination of a framework, wheels upon which the same is supported, a compressor adapted to reciprocate in horizontal plane, a shaft adapted to rotate in a direction opposite to said wheels, means whereby said wheels drive said shaft, an arm eccentrically pivoted to said shaft, an arm in pivotal relation with said compressor, and means for securing said arms together.

7. In a hay-press, the combination of a reciprocating compressor, a rake adapted to gather the hay from the ground, means to forward the hay from said rake to a point where the hay is acted upon by said compressor, and means connected to the compressor for actuating said means for forwarding the hay.

8. In a hay-press, the combination of a reciprocating compressor adapted to travel in a substantially horizontal plane, a rake carried therebeneath and adapted to gather the hay from the ground, a movable table, means to forward said hay from said table, and means actuated by the compressor adapted to move said table to a point where the hay carried thereupon will be acted upon by said compressor.

9. In a hay-press, the combination of a reciprocating compressor adapted to travel in a substantially horizontal plane, a rake carried therebeneath and adapted to gather the hay from the ground, a movable table, means to forward said hay from said rake to said table, means actuated by the compressor adapted to move said table to a point where the hay carried thereupon will be acted upon by said compressor, and means for forwarding the hay from said rake to said table.

10. In a hay-press, the combination of a reciprocating compressor, means adapted to remove the hay from the ground, a table adapted to hold the hay at a point where it will be acted upon by said compressor, a rotating shaft, means for converting movement of said shaft into movement of said compressor, and means for converting movement of said shaft into movement of said means for forwarding the hay.

11. In a hay-press, the combination of a framework, a reciprocating compressor, means adapted to gather the hay from the ground, means to forward the hay to a point where it will be acted upon by the compressor, a lever adjacent the seat occupied by the driver, and means operated by said lever to move to inoperative position said means for removing the hay from the ground.

12. In a hay-press, the combination of a framework, a reciprocating compressor, means for elevating the hay to a point where the hay will be acted upon by said compressor, a part of said elevating means being sometimes disposed in the path of travel of said compressor, means for retaining the hay in elevated position, and means permitting the aforesaid part of said elevating means to move beyond the path of travel of the compressor.

13. In a hay-press, the combination of a framework, a reciprocating compressor, means for elevating the hay from the ground to a point where the hay will be acted upon by said compressor, said means being operated by the compressor upon the idle stroke, and means for retaining the hay in elevated position, said means for actuating the elevating means being released upon the operative stroke of the compressor.

In testimony whereof we have hereunto affixed our names in the presence of two witnesses.

JOSEPH LAPKE.
AUGUST LAPKE.

Witnesses:
  Robt. Klotz,
  Geo. A. Shafer.

---

Copies of this patent may be obtained for five cents each, by addressing the "Commissioner of Patents, Washington, D. C."